(12) United States Patent
Anderson

(10) Patent No.: US 6,529,968 B1
(45) Date of Patent: Mar. 4, 2003

(54) DMA CONTROLLER AND COHERENCY-TRACKING UNIT FOR EFFICIENT DATA TRANSFERS BETWEEN COHERENT AND NON-COHERENT MEMORY SPACES

(75) Inventor: Andrew V. Anderson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/469,171

(22) Filed: Dec. 21, 1999

(51) Int. Cl.[7] .......................... G06F 13/14; G06F 13/16
(52) U.S. Cl. ........................... 710/22; 710/26; 710/55; 711/141; 711/145; 711/146; 711/150; 711/152; 711/168
(58) Field of Search ............................ 710/22, 26, 55; 711/141, 145, 146, 150, 152, 168

(56) References Cited

U.S. PATENT DOCUMENTS

| | | | | |
|---|---|---|---|---|
| 5,251,311 A | * | 10/1993 | Kasai | 711/144 |
| 5,440,707 A | * | 8/1995 | Hayes et al. | 711/3 |
| 5,517,660 A | * | 5/1996 | Rosich | 710/52 |
| 5,526,510 A | * | 6/1996 | Akkary et al. | 710/57 |
| 5,604,882 A | * | 2/1997 | Hoover et al. | 711/121 |
| 5,829,034 A | * | 10/1998 | Hagersten et al. | 711/124 |
| 6,339,813 B1 | * | 1/2002 | Smith et al. | 711/133 |
| 6,343,346 B1 | * | 1/2002 | Olnowich | 711/121 |
| 6,351,795 B1 | * | 2/2002 | Hagersten | 711/202 |

* cited by examiner

Primary Examiner—Jeffrey Gaffin
Assistant Examiner—Rehana Perveen
(74) Attorney, Agent, or Firm—Kenyon & Kenyon

(57) ABSTRACT

In a computer system, an agent, a DMA controller and a memory controller are provided, each in communication with a bus. The DMA controller and the memory controller also can communicate with each other via a second communication path. The computer system may include a memory provided in communication with the memory controller having a coherent memory space and a non-coherent memory space. The DMA controller transfers a portion of data from the coherent memory space with a portion of data from the non-coherent memory space with a single transaction on the external bus.

15 Claims, 4 Drawing Sheets

200

1000

DMA CONTROLLER AND COHERENCY-TRACKING UNIT FOR EFFICIENT DATA TRANSFERS BETWEEN COHERENT AND NON-COHERENT MEMORY SPACES

BACKGROUND OF THE INVENTION

The present invention relates to a bandwidth-efficient technique for performing data transfers between coherent and non-coherent memory spaces.

FIG. 1 is a block diagram of a modern computer system employing a multi-agent architecture. There, a plurality of agents 110–160 communicate over an external bus 170 according to a predetermined bus protocol. "Agents" refer to any circuit that communicates over an external bus and may include general purpose processors, chipsets for memory and/or input output devices or other integrated circuits that process data requests. The agents 110–160 initiate bus transactions on the bus 170 to transfer data among one another.

The agents 110–160 may include internal caches (not shown) for the temporary storage of data. It is possible that two or more agents may store copies of the same data simultaneously. The agents 110–160 operate according to cache coherency rules to ensure that each agent (say, 110) uses the most current copy of the data available to the system. According to many cache coherency systems, each time an agent 110 stores a copy of data, it assigns to the copy a state indicating the agent's rights to the data.

For example, the Pentium Pro® processor, commercially available from Intel Corporation, operates according to the "MESI" cache coherency scheme, identifying data as in Modified, Exclusive, Shared, or Invalid state. Each copy of data stored in an agent 110 is assigned one of four states including:

Invalid—Although an agent 110 may have cached a copy of the data, the copy is unavailable to the agent. The agent 110 may neither read nor modify an invalid copy of data.

Shared—The agent 110 stores a copy of data that is valid and possesses the same value as is stored in external memory. Copies of the data may be stored with other agents also in shared state. An agent 110 may only read data in shared state. An agent 110 may not modify data in shared state without first performing an external bus transaction to gain exclusive ownership of the data.

Exclusive—The agent 110 stores a copy of data that is valid and may possess the same value as is stored in external memory. When an agent 110 caches data in exclusive state, it may read and modify the data without cache coherency check via the external bus 170.

Modified—The agent 110 stores a copy of data that is valid and "stale." A copy cached by the agent 110 is more current than the copy stored in external memory. When an agent 110 stores data in modified state, no other agents possess a valid copy of the data.

Before an agent 110 may operate on a copy of data, it must possess a copy of the data with a coherency state that is appropriate for the operation that it will perform. For example, to modify data, an agent 110 must possess a copy of data in either exclusive or modified state. Even if the agent possesses the data in shared state, the agent must issue a bus transaction that is observed by the other agents before it can advance the state of the data to the exclusive state. Agents 110–160 exchange cache coherency messages, called "snoop responses," during the external bus transactions. Once an agent receives snoop responses from the other agents, the transaction has been "globally observed" and the agent may advance the state of the data.

The Pentium Pro® processor has a linear 32-bit address space that permits direct addressing to 4 GB of memory. Data coherency techniques may extend to some or all data within this memory space (which, accordingly, may be called the "coherent memory space"). The Pentium Pro® also supports a "page size extension" mode that provides an effective 36-bit address space and extends memory access to up to 64 GB. Data coherency protection typically does not extend to this extended space, called the "non-coherent memory space" for purposes of this discussion. The Pentium Pro® processor typically "works" in the coherent memory space—most of the reading and writing of data to external memory is directed to the coherent memory space. When the processor requires access to data in the non-coherent memory space, it typically causes a page transfer to be made, swapping the data from the non-coherent space with some portion of data in the coherent memory space.

The page swap typically is managed by the processor and is done on a cache line by cache line basis. Conventionally, four bus transactions were required to swap each cache line in each of the pages—a read/write pair to read a cache line from the coherent space to the non-coherent space and a second read/write pair to read the cache line from the non-coherent space to the coherent space. Because the processor itself manages the transfer, each of the bus transactions occurs on the external bus 170.

There are 128 cache lines in a page in a Pentium Pro® system. Thus, the process of swapping pages from coherent space to non-coherent space consumes a large amount of bandwidth on the external bus. Page swapping contributes to bus congestion, prevents the bus from fulfilling data requests from other agents and, accordingly, slows the system's performance.

Accordingly, there is a need in the art for a page swapping technique that reduces bus congestion and improves system performance. There is a need in the art for a page swapping technique that reduces use of the external bus.

SUMMARY

Embodiments of the present invention provide a computer system in which an agent, a DMA controller and a memory controller are provided each in communication with a bus. The Direct Memory Access ("DMA") controller and the memory controller also can communicate with each other via a second communication path. The computer system may include a memory provided in communication with the memory controller having a coherent memory space and a non-coherent memory space. The DMA controller swaps a portion of data from the coherent memory space with a portion of data from the non-coherent memory space with a single transaction on the external bus.

DETAILED DESCRIPTION

Embodiments of the present invention provide a DMA engine for page swapping among coherent and non-coherent space. The DMA engine interfaces with the external bus and also has a direct interface to a memory controller. Because the data in the coherent memory space is the only data to which coherency protections attach, only one bus transaction, the reading of data from the coherent memory space, is performed on the external bus. The other transactions, the writing of the data to the non-coherent space and the reading of data from non-coherent space and writing of it to the coherent space, may be performed through the direct DMA engine-to-memory controller communication path.

Figure 1:
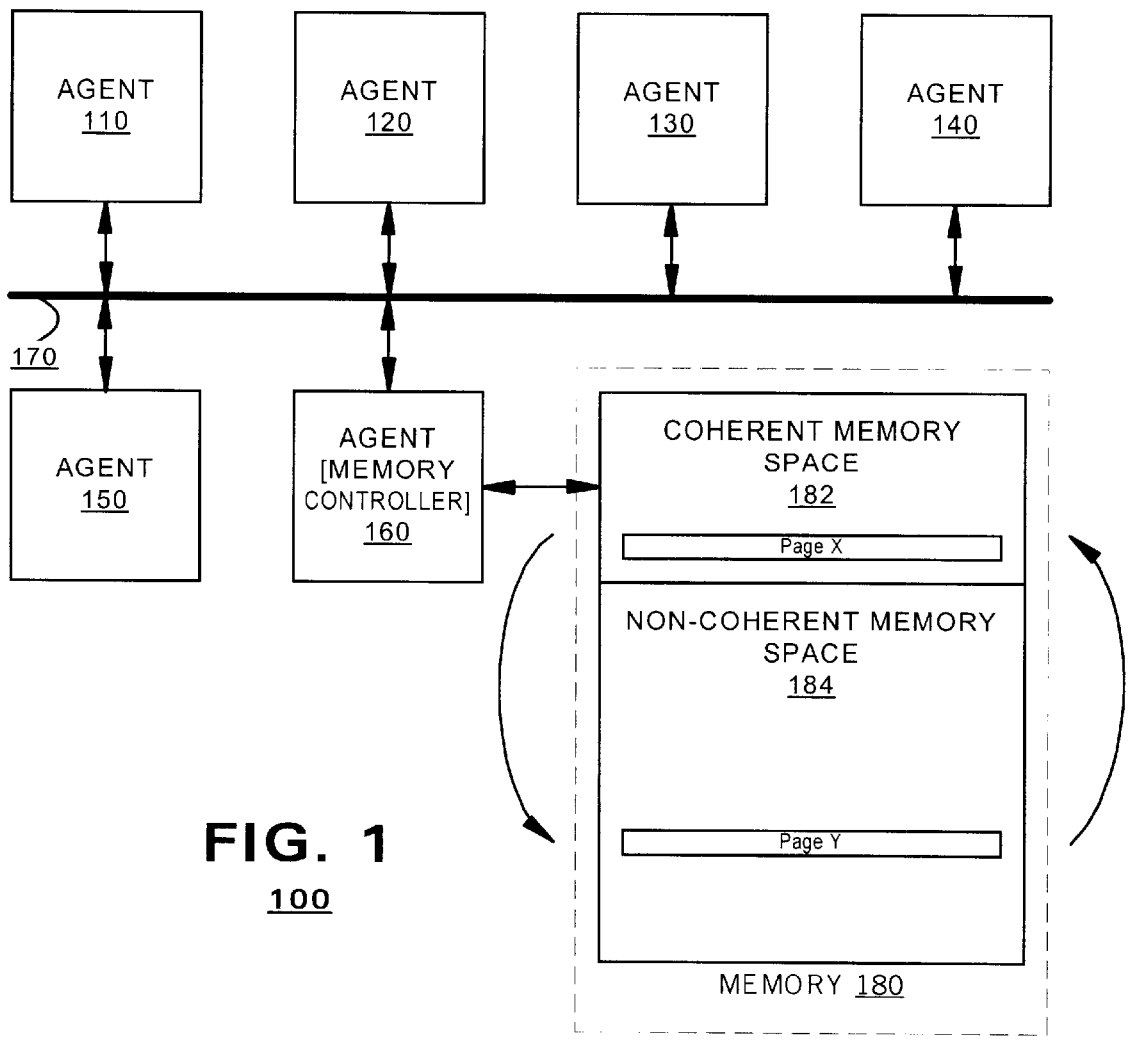
FIG. 1 is a block diagram illustrating a conventional processing system.
Figure 2:
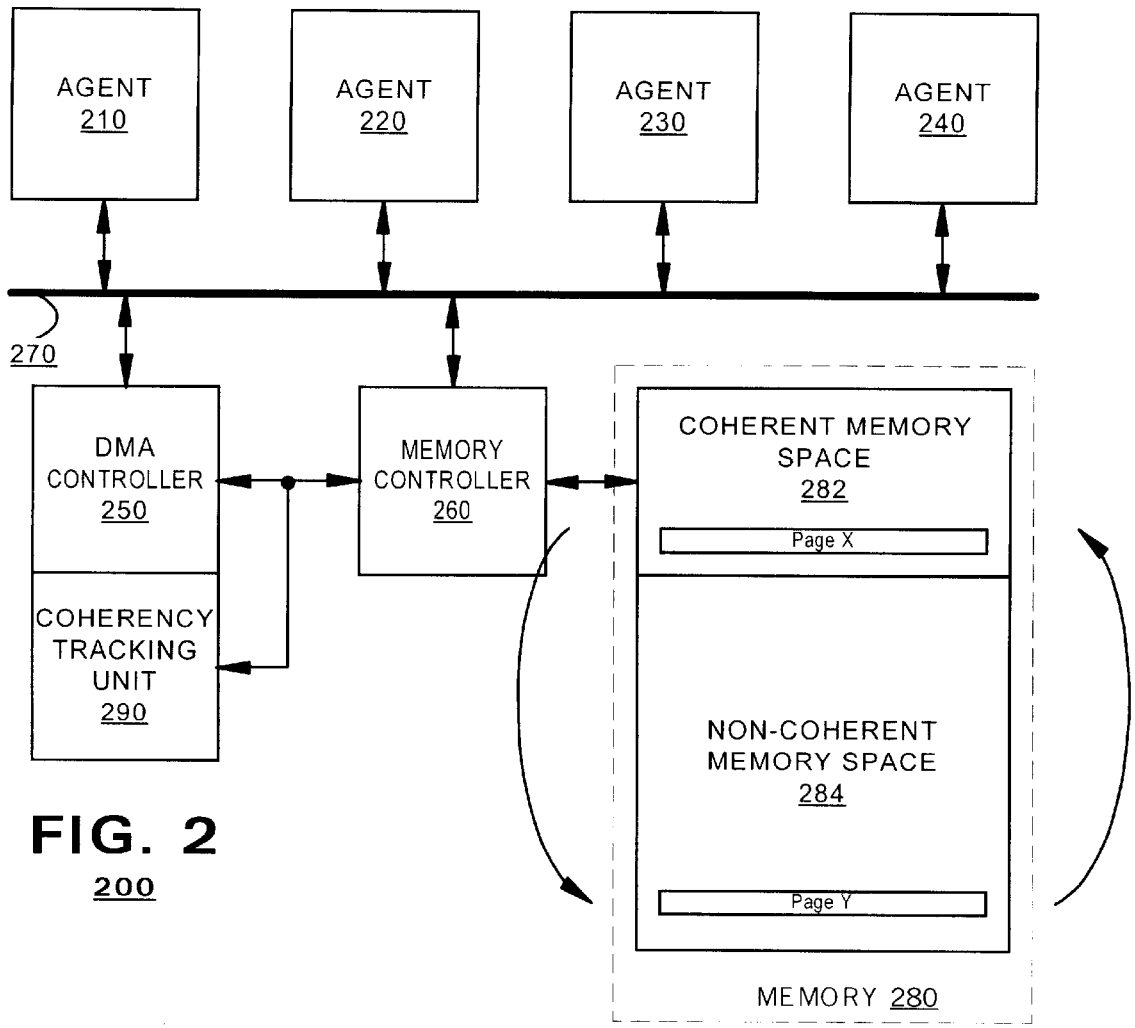
FIG. 2 is a block diagram illustrating a computer system according to an embodiment of the present invention.

FIG. 2 illustrates a computing system according to an embodiment of the present invention. The computer system 200 includes a plurality of agents 210–260 each in communication with an external communication bus 270. One of the agents 260 is a memory controller that controls access by the other agents 210–240 to a memory 280. Another of the agents is a DMA controller 250. The DMA controller 250 communicates over the external bus but also communicates directly with the memory controller 260 via a secondary path one that does not include the external bus 270.

The memory 280 includes a coherent memory space 282 and a non-coherent memory space 284. As in conventional computing systems, it may sometimes be useful to perform a page swap between a page in the coherent memory space 282 (shown as Page X) and a page in the non-coherent memory space 284 (shown as Page Y). According to an embodiment of the present invention, page swapping is not managed by a requesting agent (say, 210) but rather may be performed by the DMA controller 250. This embodiment frees resources within the agent 210 for other uses. In essence, the agent 210 "delegates" responsibility for the page swap to the DMA controller 250. The agent 210 generates a command on the external bus 270 instructing the DMA controller 250 to perform a page swap between pages X and Y in the respective coherent and non-coherent memory spaces 282, 284. The DMA controller 250 causes the page swap to occur and, upon completion, generates a response message on the external bus 270 indicating that the page swap is complete.

A DMA page swap may be "chained." According to an embodiment, an agent may identify several page swaps with a single command. The DMA controller 250 may perform multiple page swaps in response to the single page swap command. When the multiple page swaps complete, the DMA controller 250 may generate a single response message on the external bus 270 indicating that all page swaps are complete.

The page swap may occur on a cache-line-by-cache-line basis. The DMA controller 250 reads a cache line from Page X and buffers it. It also reads a corresponding cache line from Page Y and buffers it. Then, the DMA controller 250 writes the cache line originally from Page X to the non-coherent memory space 284 and writes the cache line originally from Page Y to the coherent memory space 282. The process repeats for the subsequent cache lines in each of the pages X and Y until the page swap completes.

When a page swap begins, copies of the contents of Page X may be distributed among various agents within the system 200. Thus, the DMA controller 250 posts "read for ownership" requests on the external bus 270 that cause the other agents to invalidate any copies that they store in internal caches (and writeback any modified data that may be more current than the copy stored in the memory 280). The DMA controller 250, however, causes the contents of Page Y to be read from the non-coherent memory space 284 via the secondary communication path between the DMA controller 250 and the memory controller 260. Reads from the DMA controller 250 to the non-coherent memory space 284 do not occur via the external bus 270. Also, the DMA controller 250 causes data to be written to both coherent memory space 282 and the non-coherent memory space 284 via the secondary communication path between the DMA controller 250 and the memory controller 260. The two writes do not occur via the external bus 270.

This embodiment of the present invention conserves the resources of the external bus 270, freeing them for other uses by the agents 210–250. Where a page swap formerly required four external bus transactions for each cache line in a page, this embodiment of the present invention requires only one. This embodiment of the present invention conserves bus resources, permitting them to serve other agents and improve system performance as a whole.

According to an embodiment of the present invention, the page transfer process described above operates in the absence of speculative accesses for data.

According to another embodiment of the present invention, a computing system 200 may include a coherency-tracking unit 290 that maintains coherency integrity in the face of speculative read requests that may be issued by agents during the progress of a page swap. Such reads may occur after the DMA controller 250 issues its read for ownership for a cache line in page X but before it writes the corresponding cache line from page Y into coherent memory space 284. In the absence of the coherency tracking unit 290, coherency rules could be violated because an agent may store a copy of data associated with Page X and associate the data with an address in the coherent memory space 282 when, in fact, the coherent memory space 282 would store Page Y. Page X would have been moved to non-coherent space 284.

Thus, according to an embodiment of the present invention, the system 200 may include a coherency-tracking unit 290. FIG. 2 illustrates the coherency-tracking unit 290 as integrated with the DMA controller 250 but it may be provisioned as a separate agent if so desired. The coherency-tracking unit 290 is provided with access to the external bus 270 and also the direct DMA controller-to-memory controller communication link.

Figure 3:
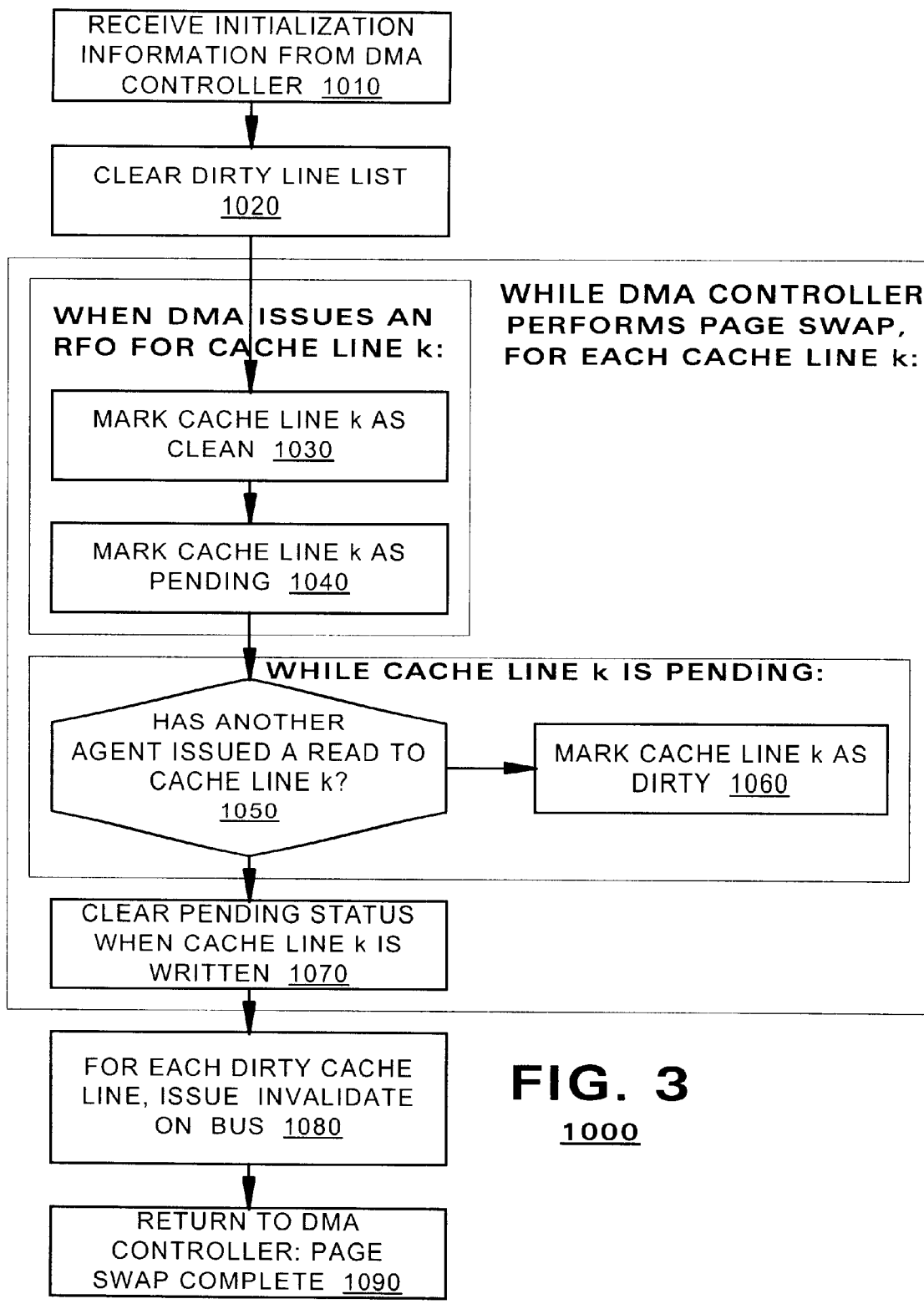
FIG. 3 is a flow diagram of a method of operation according to an embodiment of the present invention.

FIG. 3 is a flow diagram illustrating a method of operation 1000 of the coherency-tracking unit 290 according to an embodiment of the present invention. The coherency-tracking unit 290 is engaged when it receives initialization information from the DMA controller 250 indicating that a page swap will occur and identifying an address range within the coherent memory space 282 that is subject to the page swap (Step 1010). In response, the coherency-tracking unit 290 initializes a "stale line list" associated with the page swap (Step 1020). Initially, the stale line list is empty.

The DMA controller 250 begins to read and write cache lines between coherent and non-coherent memory space 282, 284 (FIG. 2). When the DMA controller issues a read for ownership to a particular cache line k, the coherency-tracking unit 290 marks the cache line as clean and also marks the cache line as pending (Steps 1030, 1040). Thereafter, while the cache line k is marked as pending, the coherency-tracking unit 290 monitors bus transactions on the external bus to determine whether any other agent issues a read request directed to the cache line (Step 1050). If so, the coherency-tracking unit 290 marks the cache line as stale; it may include the cache line k in the stale line list (Step 1060). Sometime later, the DMA controller 250 will complete the swap for cache line k. The coherency-tracking unit 290 clears the pending status that was marked at step 1040 (Step 1070).

Steps 1030–1070 are conducted independently and in parallel for all cache lines subject to the page swap. When the DMA controller 250 completes the data transfer, the coherency-tracking unit 290 will have assembled a list of cache lines in the stale line list. These cache lines are the cache lines that were requested by other agents 210–240 while the DMA controller 250 was engaged in the process of moving the cache lines to non-coherent space. When the data transfer process is complete, the coherency-tracking unit 290 causes any copies of the stale cache lines that may exist in the other agents 210–240 to be invalidated.

For each cache line identified in the stale line list, the coherency-tracking unit 290 issues an "invalidate" command on the external bus 270 identifying the coherent space address of the cache line (Step 1080). As is known, an invalidate command causes all other agents 210–240 on the bus 270 to invalidate their copies of the requested data. After the invalidate command is issued for the last cache line in the stale line list, the coherency-tracking unit 290 permits the DMA controller 250 to conclude the page swap (Step 1090).

The preceding discussion of the data swap described the data swap as being performed on pages of data on a cache-line-by-cache-line basis. It should be understood that such description is merely exemplary. The principles of the present invention find application with other embodiments. Data swap operations may occur on data using sizes other than pages and according to granularities other than cache lines. Further data swaps may occur among more than two locations in coherent and non-coherent spaces. In one example, a data swap may cause data from a Region X of coherent space to be transferred to a Region Y of non-coherent space and data from a second Region Z in the non-coherent space to be transferred to the Region X. Such characteristics of data swaps and their granularities are well-known.

Figure 4:
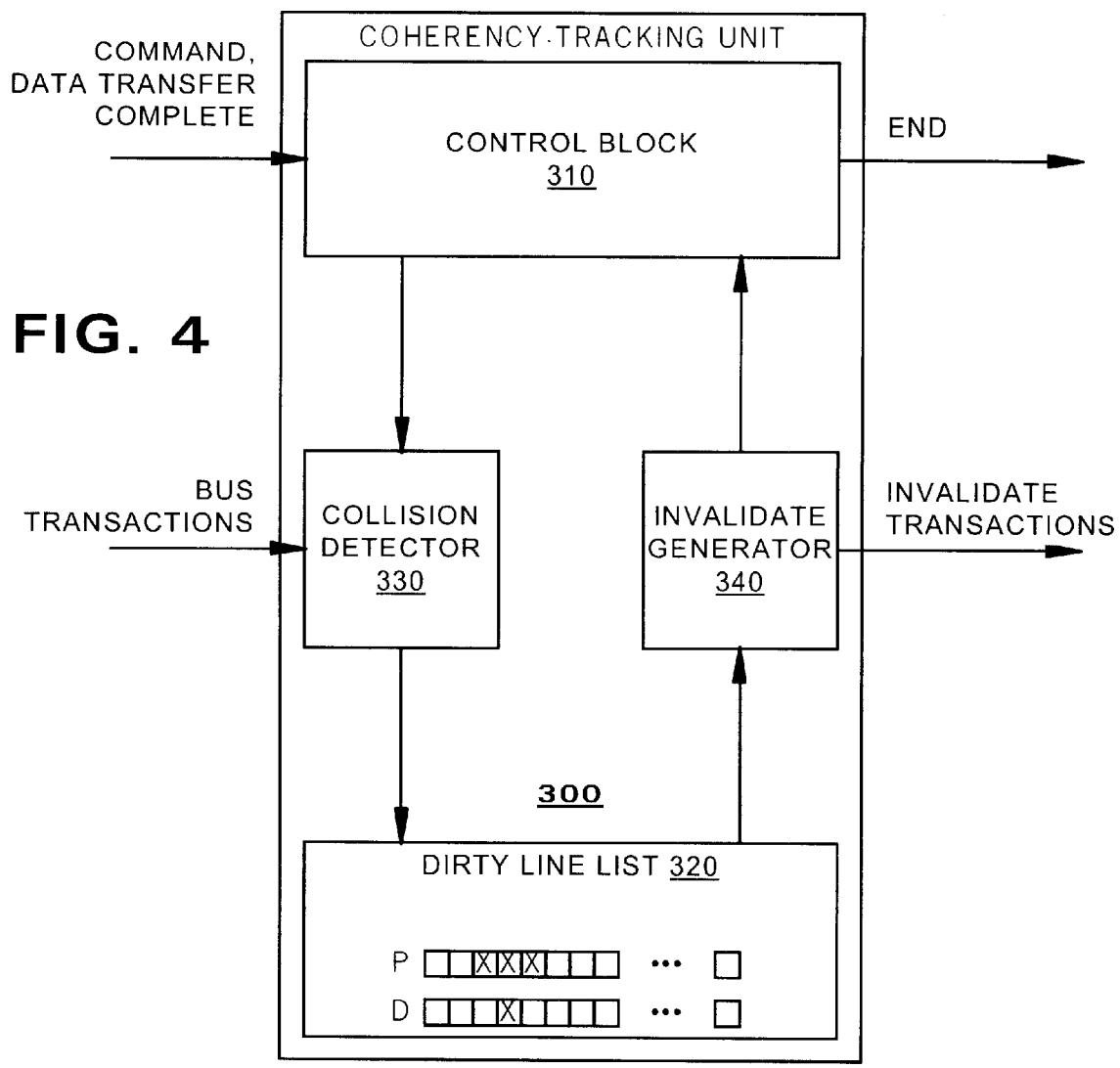
FIG. 4 is a block diagram of a coherency-tracking unit according to an embodiment of the present invention.

FIG. 4 is a functional block diagram of a coherency-tracking unit 300 according to one embodiment of the present invention. The coherency-tracking unit 300 may be populated by a control block 310, a stale line list register 320, a collision detector 330 and a invalidate generator 340. In one embodiment, these elements may be manufactured as state machines and storage cells within an integrated circuit.

The control block 310 interfaces with associated hardware from within the DMA controller. The control block 310 receives signals from the DMA controller identifying the initiation of a page swap and also identifying an address range in the coherent memory space that is subject to the page swap. The control block 310 initializes the collision detector 330 with the address range.

The collision detector 330 monitors read requests that occur on the external bus. It determines when the DMA controller issues the read for ownership requests for cache lines in the page swap and marks the cache line as pending. In the embodiment shown in FIG. 4, the stale line list register maintains a register that identifies for each cache line in the page swap whether the cache line is pending. Such a register alternatively could be maintained in the collision detector 330.

The collision detector 330 also monitors the external bus to determine whether any read requests issued by the other agents address the pending region. If so, a "collision" occurs. In response to a collision, the collision detector 330 signals the stale line list 320 identifying the cache line so addressed. The identified cache line will be marked as stale if the cache line is pending.

The collision detector 330 additionally monitors DMA transfers to determine when the data transfer for each cache line is complete. When data transfer for a cache line completes, the collision detector 330 clears the pending status associated with the respective cache line. In an embodiment where the pending register is maintained in the stale line list 320, clearing the pending status of a register may involve communicating with the stale line list identifying the cache line and instructing the stale line list to clear the pending status of the cache line.

The stale line list 320 stores the list of stale cache lines. It may include control logic that marks or clears the pending status of cache lines in response to commands from the collision detector. It also may include a state machine that, in response to a collision notification from the collision detector 330, checks the pending state of the cache line and marks the cache line as stale when the cache line is pending.

When the DMA controller completes the data transfer for the page swap, it notifies the control block 310 of the coherency tracking unit 300. In response, the coherency tracking unit 300 disables the collision detector 330 and enables the invalidate generator 340.

The invalidate generator 340 steps through the stale line list and interfaces with the DMA controller to cause read invalidate commands to be posted on the external bus. The invalidate generator tests bits within the stale register to determine if they have been marked as stale, indicating that the corresponding cacheline was read while in the pending state. When it encounters an enabled bit in the stale register, the invalidate generator 340 determines the address associated with the stale cache line and presents it to the DMA controller, causing the DMA controller to post an invalidate transaction on the bus. When the invalidate transaction is posted, the invalidate generator 340 clears the stale bit associated with the respective cache line. The invalidate generator 340 cycles through the entire stale line list register, invalidating any stale cache line that it encounters.

When all stale bits are cleared, the invalidate generator notifies the control block 310. The control block 310 notifies the DMA controller and the coherency-tracking unit 300 advances to an idle state.

The present invention provides a DMA controller for page swaps between coherent and non-coherent space. Such a controller removes page swap management functions from other agents and permits them to spend resources on other functions. The present invention also provides a coherency-tracking unit that works in combination with the DMA controller to ensure that coherency integrity is maintained during the performance of the page swap. If another agent reads data subject to the page swap, the coherency-tracking unit marks the data as stale and, upon conclusion of the page swap, causes all other agents to invalidate their copies of the data.

The preceding discussion has used specific examples to facilitate an understanding of the present invention. For example, certain discussion has directed the reader to the Pentium Pro® processor, a device that has a predefined addressing space, cache line size, page size. It should be understood that reference to this device has been made to facilitate the discussion of certain embodiments of the present invention and should not be considered limiting. The principles of the present invention may find application beyond any use with the specific embodiments disclosed herein and, indeed may find application with devices of varying cache line sizes, page sizes and address spaces.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. A computer system, comprising:
   an agent, a DMA controller and a memory controller, each provided in communication with a bus, the DMA controller and the memory controller provided in communication with each other via a second communication path; and
   a memory, provided in communication with the memory controller, the memory having a coherent memory space and a non-coherent memory space;
   wherein the DMA controller is to transfer a portion of data from the coherent memory space to the non-coherent memory space and to transfer a portion of data from the non-coherent memory space to the coherent memory space with a single transaction on the bus.

2. The computer system of claim 1, wherein the portion of data is a cache line.

3. The computer system of claim 1, further comprising a coherency-tracking unit to monitor read requests while the DMA controller transfers the portions of data and, if the agent issues a read request that references the portion of data, to invalidate copies of the data with the agent after the DMA controller completes the transfers.

4. A method of transferring pages of data among coherent and non-coherent memory spaces in a computer system, comprising:
   reading first data from a coherent memory space via a bus,
   reading second data from a non-coherent memory space via a secondary communication path,
   writing the second data to the coherent memory space via the secondary communication path,
   writing the first data to the non-coherent memory space via the secondary communication path,
   between the first reading and the second writing, determining whether there have been reads to the coherent memory space from other agents,
   after the second writing, invalidating any reads from the other agents to the coherent memory space.

5. The method of claim 4, further comprising, monitoring the bus for read requests to the coherent memory space and, if a read request references addresses of the first data, generating an invalidate command on the bus after the conclusion of the writings.

6. The method of claim 4, wherein the reading and writings are performed on a cache-line by cache-line basis.

7. A method of transferring pages of data among coherent and non-coherent memory spaces in a computer system, comprising:
   reading first data at the coherent memory space, wherein the reading of the first data is globally observed,
   reading second data from the non-coherent memory space,
   writing the first data to the non-coherent memory space, and
   writing the second data to the coherent memory space,
   wherein the reading of the second data and the two writings are not globally observed,
   determining whether there have been reads to the coherent memory space from other agents prior to global observation, and
   after the second writing, invalidating any detected reads from the other agents.

8. The method of claim 7, wherein the first data is read from the coherent memory space.

9. The method of claim 7, wherein the first data is read from another agent via a writeback.

10. The computer system of claim 3, wherein the coherency-tracking unit comprises:
    a control block,
    a collision detector in communication with the control block,
    a stale line register in communication with the collision detector, and
    an invalidate generator in communication with the control block and the stale line register.

11. In a computer system having a plurality of agents operating cooperatively according to a cache coherency protocol, a method of swapping data among coherent and non-coherent memory spaces, comprising:
    reading first data from the coherent memory space via a first communication path that is public to the plurality of agents,
    reading second data from the non-coherent memory space via a secondary communication path that is private from the plurality of agents,
    writing the first data to the non-coherent memory space via the secondary communication path, and
    writing the second data to the coherent memory space via the secondary communication path.

12. The method of claim 11, further comprising:
    during the data swapping:
        monitoring the first communication path for read requests that are not part of the data transfer operation, and
        if any of the monitored read requests are directed to an address of the first data, marking the address as stale,
    after the data transfer operation, for each stale address, generating an invalidate command on the first communication path identifying the stale address.

13. The method of claim 11, further comprising:
    during the data swapping:
        responsive to the reading of the first data from the coherent memory space, marking an address associated with read as pending,
        monitoring the bus for read requests that are not part of the data transfer operation,
        if any of the monitored read requests are directed to an address that has been marked as pending, marking the address as stale,
        responsive to the writing of the first data to the non-coherent memory space, clearing the pending status of the address associated with the first read request, and thereafter, for each stale address, generating an invalidate command on the first communication path identifying the stale address.

14. The method of claim 11, wherein:
    the method causes a swap of pages of data between the coherent and non-coherent memory spaces, and
    the readings and writings each are performed on cache line sized increments of data from within the respective pages.

15. The method of claim 11, wherein the method causes a swap of a cache line sized increment of data.

* * * * *